United States Patent [19]

Yamamura et al.

[11] Patent Number: 5,589,230
[45] Date of Patent: Dec. 31, 1996

[54] POLYMERIZABLE, CURABLE MOLDING COMPOSITION AND A MOLDING OR COATING PROCESS USING THIS MOLDING COMPOSITION

[75] Inventors: Yoshitami Yamamura; Nobuhiko Morimoto; Nobuyuki Tanaka, all of Hyogo-ken, Japan

[73] Assignee: Henkel Kommanditgesellschaft auf Aktien, Duesseldorf, Germany

[21] Appl. No.: 418,977

[22] Filed: Apr. 7, 1995

Related U.S. Application Data

[63] Continuation-in-part of PCT/EP93/02671, Sept. 30, 1993.

[30] Foreign Application Priority Data

Oct. 9, 1992 [JP] Japan .................................. 4-271463
Mar. 1, 1993 [JP] Japan .................................. 5-40066

[51] Int. Cl.$^6$ ....................................... B05D 3/06
[52] U.S. Cl. ...................... 427/493; 427/386; 427/518; 427/519; 427/520; 522/8; 522/103; 522/170
[58] Field of Search ...................... 427/386, 493, 427/508, 518, 519, 520, 244; 522/8, 103, 170; 264/53, 54

[56] References Cited

U.S. PATENT DOCUMENTS

| | | | |
|---|---|---|---|
| 4,203,816 | 5/1980 | Vargiu et al. | 204/159.16 |
| 4,229,274 | 10/1980 | Carlblom | 204/159.15 |
| 4,672,079 | 6/1987 | Li Bassi et al. | 522/35 |
| 4,703,338 | 10/1987 | Sagami et al. | 357/72 |
| 4,789,620 | 12/1988 | Sasaki et al. | 430/280 |
| 4,970,135 | 11/1990 | Kushi et al. | 430/280 |
| 5,151,454 | 9/1992 | Goto et al. | 522/93 |
| 5,453,451 | 9/1995 | Sokol | 522/42 |

FOREIGN PATENT DOCUMENTS

| | | |
|---|---|---|
| 2318884 | 2/1977 | France . |
| 7108139 | 7/1982 | Japan . |
| 2169643 | 7/1987 | Japan . |
| 1169755 | 7/1989 | Japan . |
| 2235917 | 9/1990 | Japan . |
| 3188102 | 8/1991 | Japan . |
| 3210324 | 9/1991 | Japan . |
| 9422596 | 3/1994 | WIPO . |

OTHER PUBLICATIONS

Abstract of JP 57–108139, Jul. 1982.
Radtech Asia '91, Conf. Proc. (1991) 398–403.
Di Battista et al, "New Optimized Oligomeric Alpha Hydroxy Acetophenone Photo Initiator".

*Primary Examiner*—Michael Lusignan
*Assistant Examiner*—Erma Cameron
*Attorney, Agent, or Firm*—Wayne C. Jaeschke; John Daniel Wood; Daniel S. Ortiz

[57] ABSTRACT

A polymerizable curable molding composition comprising (A) 100 parts by weight of an unsaturated epoxyester resin with an acid value below 3.0, (B) 10 to 40 parts by weight of a polymerizable monomer selected from the group consisting of phenoxyethyl acrylate, 2-acroyloxyethyl-2-hydroxypropyl phthalate and mixtures thereof and (C) 1 to 5 parts by weight of a mixture of hydroxyketone oligomer and 2-hydroxy-2-methyl-1-phenylpropan-1-one. The molding composition also preferably comprises 0.5 to 5 parts by weight of polystyrene microbeads. Also provided are a molding process using the polymerizable curable molding composition and a coating process using the polymerizable curing molding composition, each process being characterized by combined exposure of the composition to UV radiation and heating.

32 Claims, 1 Drawing Sheet

POLYMERIZABLE, CURABLE MOLDING COMPOSITION AND A MOLDING OR COATING PROCESS USING THIS MOLDING COMPOSITION

CROSS-REFERENCE TO RELATED APPLICATION

This application is a continuation-in-part of PCT International application number PCT/EP93/02671, filed Sep. 30, 1993, the disclosure of which, including both figures, is incorporated herein by reference.

1. Field of the Invention

This invention relates to a polymerizable, curable molding composition which may be molded by heating to relatively low temperatures and, at the same time, exposure to UV radiation and to a molding or coating process using this molding composition.

2. Description of Related Art

Unsaturated epoxyesters made from epoxy resin and unsaturated carboxylic acid have hitherto been widely used for anti-corrosion coatings or gel coatings for the FRP process because the unsaturated epoxyester is easy to handle by virtue of its low viscosity and can be cured at relatively low temperatures, the cured ester resin being distinguished by excellent resistance to water and chemicals and adhesion to metals. Recently, this ester has also been used for coating, bonding and sealing electrical/electronic components and for molding optical data storage media, such as laser disks for example, by utilization of the photocuring property of its unsaturated bond (JP Kokai Sho 62-169643, JP Kokai Hei 1-169755).

Although unsaturated epoxyesters cure quickly by exposure to UV radiation, this application has been limited to the coating, lining or molding of thin bodies, because the conventional unsaturated epoxyester does not crosslink satisfactorily in curing thick-walled bodies. According to JP Kokai Hei 1-169775, epoxyvinyl ester formulated with organic peroxide is poured into a narrow gap (1.2 mm thick) between a metal plate and a transparent plastic plate and is cured by exposure to UV radiation to form the laser disk.

JP Kokai Hei 2-235917 and Hei 3-188102 relate to the use of a composition of epoxyacrylate and bisphenol A epoxy resin with its hardener and photochemical initiator for sealing electronic components. Unfortunately, this composition has a short shelf life so that difficulties arise in the event of long-term storage.

JP Kokai Hei 3-210324 describes the use of a mixture of a UV-curable synthetic resin containing acrylic and epoxy groups and a fatty amine epoxy derivative as a potting compound for electrical components. However, this process uses a proportioning-and-blending machine for mixing the two components. Accordingly, this system requires expensive machinery for industrial application.

Accordingly, there was still a need for a composition with a long shelf life for molding, potting or sealing compounds which could be cured simply by exposure to UV radiation to form thick-walled bodies.

Taking the above-stated requirements into account, the problem addressed by the present invention was to provide a polymerizable, curable molding composition with a long shelf life which would contain unsaturated epoxyester as its principal component and which could be cured by exposure to UV radiation or by combined exposure to UV radiation and heating (30° to 50° C.) to form a thick-walled molded or potted article (up to 50 mm thick) or a coating. The product thus molded or coated would show good hardness, adhesion to metals, resistance to water, excellent electrical properties and minimal crack formation or shrinkage. These properties are desirable for electrical/electronic components and for auto parts.

SUMMARY OF THE INVENTION

After extensive investigations, it has been found that a special unsaturated epoxyester containing a certain photoinitiator can be cured in a short time by simultaneous exposure to UV radiation and gentle heating to form thick-walled potted or molded articles (up to 50 mm thick). Accordingly, the present invention relates to a process for molding or coating electrical/electronic components and auto parts using a resin composition consisting of (A) 100 parts of unsaturated epoxyester with an acid value below 3.0 (KOH mg/g), (B) 10 to 40 parts of phenoxyethyl acrylate, 2-acroyloxyethyl-2-hydroxypropyl phthalate or a mixture thereof and (C) 1 to 5 parts of a mixture of hydroxyketone oligomer and 2-hydroxy-2-methyl-1-phenylpropan-1-one as photoinitiator and optionally (D) 0.5 to 5 parts of polystyrene microbeads, which is characterized by combined exposure to UV radiation and heating at relatively low temperatures.

The invention also lies in the choice of the above resin composition containing components A to C and optionally D.

DETAILED DESCRIPTION OF THE INVENTION

Figure 1:
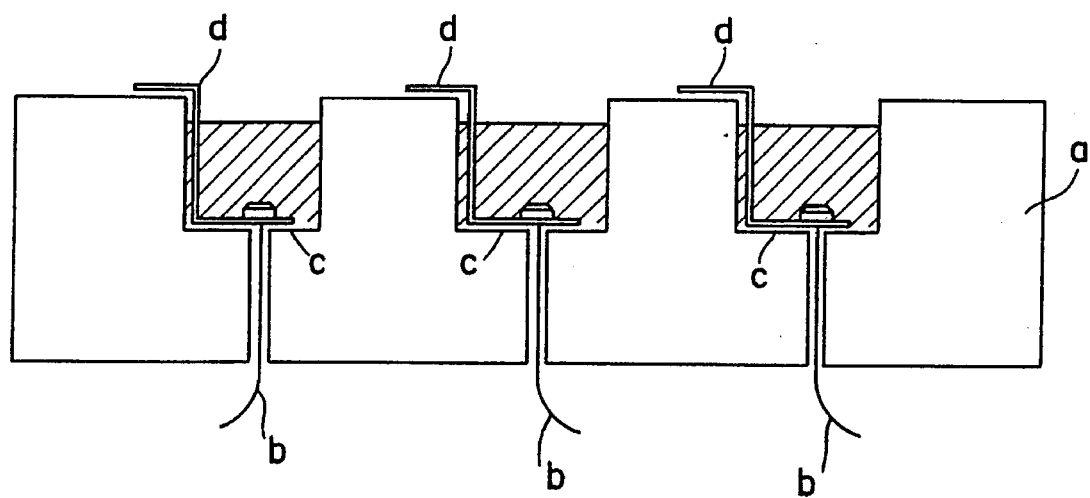
FIG. 1 is a view of an electrical terminal assembly.

The unsaturated epoxy resin used in accordance with the present invention is prepared in known manner (Japanese patent publications 44-31836, 45-15988, 45-40069), namely from unsaturated carboxylic acid and epoxy compound or from a mixture of unsaturated/saturated carboxylic acid and epoxy compound, the unsaturated epoxyester resin being diluted with polymerizable monomer for practical application. (The dilute solution is referred to hereinafter as "unsaturated epoxy resin composition".)

The unsaturated epoxyester resin according to the invention is prepared by reaction of a total of less than 1.0 mole of carboxyl groups with 1.0 mole of epoxy groups, the esterification reaction being continued until the acid value of the reaction mixture has fallen below 3.0 in order to keep the percentage of unreacted carboxylic acid in the resin formed as low as possible. An acid value above 3.0 in the unsaturated epoxyester resin can lead to incomplete curing on exposure to UV radiation and can give rise to inadequate electrical properties.

The carboxylic acid used in accordance with the invention for the production of the unsaturated epoxyester resin or at least part thereof should be a polymerizable unsaturated carboxylic acid such as, for example, maleic acid, fumaric acid, itaconic acid, acrylic or methacrylic acid. Saturated, aliphatic or aromatic acids and long-chain, monobasic or polybasic carboxylic acids may be used in accordance with the invention as part of the carboxylic acid. Suitable saturated carboxylic acids are aliphatic acids such as, for example, butyric acid, lauric acid, stearic acid or hydroxystearic acid. Suitable polybasic carboxylic acids are succinic acid, adipic acid, azelaic acid, sebacic acid or hexahydrophthalic acid. Aliphatic acids may also be useful for adjusting the oiliness of the resin formed which in turn can be useful for adjusting the molecular weight of the resin. Non-polymerizable or substantially non-polymerizable carboxylic acids are, for example, oleic acid and ricinoleic acid. The acids are suitable for imparting flexibility to the resin. Phthalic acid, isophthalic acid and trimellitic acid may be used as aromatic carboxylic acids.

The polymerizable unsaturated carboxylic acid mentioned above may be present in a quantity of at least 10 equivalent-%, preferably in a quantity of 20 to 95 equivalent-% and more preferably in a quantity of 40 to 80 equivalent-%, based on total acid. If less than 10 equivalent-% of unsaturated acid is used, the resin formed may exhibit poor curing properties. On the other hand, more than 95 equivalent-% of unsaturated acid can lead to insufficiently dry coating films.

Epoxy compounds capable of reacting with carboxylic acids include reaction products of epichlorohydrin with bisphenol A, glycols, carboxylic acids or phenol/formaldehyde condensates and oxidation products of unsaturated compounds and combinations of more than two thereof. Commercial types of these epoxy compounds include Epikote (Yuka Shell Epoxy Co.), Araldite (Ciba-Geigy Japan Ltd.), D.E.R. (Dow Chem. Japan Ltd.), Epotohto (Tohto Kasei Co.) and the like.

The polymerizable monomer performs the function of reducing the viscosity of the epoxyester and the resin composition and should be selected from those monomers which do not adversely affect the curability or physical properties of the cured resin. Polymerizable monomers of the type in question are phenoxyethyl acrylate, 2-acroyloxyethyl-2-hydroxypropyl phthalate or a mixture of one or two such monomers with one or more than one monomer from the following group: styrene, vinyl toluene, divinyl benzene, methyl methacrylate, methacrylonitrile, diallyl phthalate and 2-ethylhexyl acrylate. The ratio by weight of diluent to unsaturated epoxyester composition is 10–40 parts, preferably 15–20 parts : 100 parts. A smaller quantity than 10 parts by weight of the diluent can give rise to handling problems through a high viscosity whereas a larger quantity than 40 parts by weight can slow the curing rate and impair the physical properties of the cured resin.

A mixture of hydroxyketone oligomer and 2-hydroxy-2-methyl-1-phenylpropan-1-one (II) is suitable as the photoinitiator. The oligomer of 2-hydroxy-2-methyl-1-[4-(1-methylvinyl)-phenyl]-propanone (I) is mentioned as an example of a hydroxyketone oligomer.

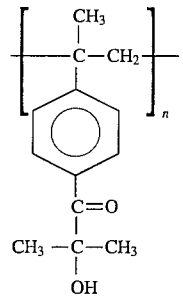
(I)

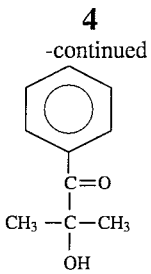
(II)

By "oligomer" is meant a substance composed of molecules containing a few of one or more species of atoms or groups of atoms repetitively linked to each other, the number of said one or more species being such that the physical properties of said oligomer vary with the removal of one or a few of said species from said molecules. The oligomer of 2-hydroxy-2-methyl-1-[4-(1-methylvinyl)phenyl]-propanone can be represented as the addition oligomerization product of the vinyl group of the monomer 2-hydroxy-2-methyl-1-[4-(1-methylvinyl)-phenyl]-propanone, the product having "n" repeating units derived from said monomer wherein "n" represents the number of repeating units. Of course, few oligomers are monodisperse and, thus, "n" will be an average expressed in the form of a complex number for a polydisperse substance.

A mixture of the hydroxyketone oligomer of 2-hydroxy-2-methyl-1-[4-(1-methylvinyl)-phenyl]-propanone and 2-hydroxy-2-methyl-1-phenylpropan-1-one (ratio 7:3) is commercially available under the registered name of "Esacure KIP 100F" (a product of Fratelli Lamberti Co.). The photoinitiator is used in quantities of 1.0 to 5.0 parts by weight and preferably in quantities of 2.0 to 3.5 parts by weight, based on 100 parts by weight of unsaturated epoxy ester composition. A quantity of less than 1.0 part by weight can lead to a reduction in the curing rate while a quantity of more than 5.0 parts by weight can give rise to yellowing of the cured product and to increased production costs. To obtain a suitable balance between the curing rate and the properties of the cured product, photosensitizers, for example benzophenone or tertiary amines, may be used in conjunction with the photoinitiator mentioned above. Similarly, promoters, such as methyl ethyl ketone or cumene peroxide, may also be used.

Additives or fillers, such as silica flour or $TiO_2$ or polystyrene microbeads, may optionally be used. In particular, the addition of a small quantity of polystyrene beads can reduce the shrinkage of the cured resin without affecting its curing properties and can minimize the gap between the resin and the wall of the mold. The "tightly molded" product formed is thus capable of preventing the penetration of moisture or corrosive gases from outside. The addition of polystyrene microbeads can also improve the thermal shock behavior of the cured resin. Accordingly, an addition such as this is favorable for electrical components exposed to thermal shock, particularly in cases where they are large in size (larger than 20 mm).

Polystyrene microbeads consist of polystyrene (diameter 0.2 to 0.5 mm) which contains a volatile liquid that foams on heating under pressure. Polystyrene microbeads such as these are commercially available as Kanepearl from Kanegafuchi Kagaku Co. The polystyrene microbeads are used in quantities of 0.5 to 5 parts and preferably in quantities of 1 to 3 parts, based on 100 parts of unsaturated polyester. The addition of the microbeads in quantities such as these ensures that they are uniformly distributed in the unsaturated polyester and produce an almost transparent, cured product without leading to difficulties during the exposure to UV radiation. Additions of more than 5 parts can impair the properties of the cured product. With additions of less than 0.5 part, the effect is inadequate.

The radiation dose in the case of combined exposure to UV radiation and heating depends upon the thickness, the amount of filler or insert added and the complexity of shape of the molded or potted article. If a 160 W/cm metal halide mercury lamp is used, an exposure time of 5 to 60 s should normally be sufficient. Thin-walled bodies may be cured simply by exposure to UV radiation at room temperature. In the case of thick-walled or insert-containing molded or potted articles (thickness 20 mm), exposure to UV radiation must be accompanied by heating to 30°–50° C. Longer exposure to UV radiation or heating at higher temperatures may optionally be applied.

The article thus molded shows minimal crack formation and shrinkage and good adhesion to the walls of the mold or to the insert. Since this system cures more quickly than the conventional system at relatively low temperatures under otherwise the same conditions, the molded articles are distinguished by minimal distortion and greater productivity.

The invention is illustrated by the following Example.

EXAMPLES

Production of the resin

The unsaturated epoxyester resin composition was prepared as follows:

Sample A

200 Parts by weight of Epikote 828 (Yuke Shell Epoxy Co.), 68 parts by weight of methacrylic acid, 1 part by weight of benzyl dimethylamine as catalyst and 0.02 part by weight of hydroquinone as inhibitor were introduced into a 1000 ml three-necked flask. The reaction was carried out over a period of 2 hours at 120° C. in the presence of air. After the reaction, the mixture was cooled to 100° C., after which 0.01 part by weight of hydroquinone and 60 parts by weight of 2-acroyloxyethyl-2-hydroxypropyl phthalate were added to the mixture and uniformly dissolved therein. Sample A obtained in this way had an acid value (KOH mg/g) of 0.49.

Sample B

Starting materials as for sample A. The reaction was carried out over a period of 1 hour 40 minutes at 120° C. in the presence of air. After the reaction, the mixture was cooled to 100° C., after which 0.01 part by weight of hydroquinone and 60 parts by weight of phenoxyethyl acrylate were added to the mixture and uniformly dissolved therein. Sample B obtained in this way had an acid value (KOH mg/g) of 1.2.

Sample C

200 Parts by weight of Epikote 828, 37 parts by weight of azelaic acid, 51 parts by weight of methacrylic acid, 1 part by weight of benzyl dimethylamine as catalyst and 0.02 part by weight of hydroquinone as inhibitor were introduced into a 1000 ml flask. The reaction was carried out over a period of 2 hours at 120° C. in the presence of air. After the reaction, the mixture was cooled to 100° C., after which 0.01 part by weight of hydroquinone and 60 parts by weight of 2-acroyloxyethyl-2-hydroxypropyl phthalate were added to the mixture and uniformly dissolved therein. Sample C obtained in this way had an acid value (KOH mg/g) of 0.34.

Sample D

Starting materials as for sample C. The reaction was carried out over a period of 110 minutes at 120° C. in the presence of air. After the reaction, the mixture was cooled to 100° C., after which 0.01 part by weight of hydroquinone and 60 parts by weight of phenoxyethyl acrylate were added to the mixture and uniformly dissolved therein. Sample D obtained in this way had an acid value (KOH mg/g) of 1.2.

Sample E

Starting materials as for sample A. The reaction was carried out over a period of 90 minutes at 120° C. in the presence of air. After the reaction, the mixture was cooled to 100° C., after which 0.01 part by weight of hydroquinone and 30 parts by weight of 2-acroyloxyethyl-2-hydroxypropyl phthalate and 30 parts by weight of phenoxyethyl acrylate were added to the mixture and uniformly dissolved therein. Sample E obtained in this way had an acid value (KOH mg/g) of 2.5.

UV irradiation test

Example 1

Quantities of 3 parts of Esacure KIP 100F (Fratelli Lamberti), a mixture of hydroxyketone oligomer and 2-hydroxy-2-methyl-1-phenylpropan-1-one, were added to quantities of 100 parts of samples A to E (prepared as described above) and comparison samples F and G (commercial unsaturated epoxyesters with acid values of 8.5 and 9.2). Quantities of 50 g of resin compositions A to G thus formed were introduced into a polyethylene container (diameter 5 cm, height 6 cm), heated to 50° C. and then exposed for 10 seconds to the radiation of a UVL-4000 M3 160 W/cm metal halide mercury lamp arranged 7 cm above the sample. The UV-irradiated samples were cooled to room temperature and then examined.

The hardness values of the samples are shown in Table 1.

TABLE 1

| | ured resin composition | | | | | | |
|---|---|---|---|---|---|---|---|
| | A | B | C | D | E | F | G |
| Hardness, Shore D | 84 | 83 | 82 | 84 | 83 | 32 | 41 |

The cured samples A to E had smooth surfaces with minimal shrinkage. Comparison samples F and G were incompletely cured and had tacky surfaces.

Example 2

Cured samples A and F from Example 1 were tested for their electrical properties. The results are set out in Table 2.

TABLE 2

| | Sample A | Sample F |
|---|---|---|
| Dielectric strength* KV/mm | 35 | 21 |
| Volume resistance* (DC500 V) ohm$^{-cm}$ | $1.5 \times 10^{14}$ | $3.3 \times 10^{13}$ |
| Dielectric constant* (1 KHz) | 5.0 | 4.5 |
| Dielectric loss factor* | 0.5 | 0.4 |
| Volume shrinkage** % | 2.2 | 3.1 |

*ASTM D-149, D-150, D-257
**SPI Method

Example 3

After aging for 1 week at room temperature, test specimens (40 mm×40 mm×5 mm) were produced from sample A of Example 1. They were immersed in various chemical solutions and stored therein for 90 days at 40° C. The test specimens were then examined; the results are listed in Table 3.

TABLE 3

| | Increase in weight | Crack formation |
|---|---|---|
| 10% Acetic acid | +2.8% | No |
| 10% HCl | +1.2% | No |
| 20% H$_2$SO$_4$ | +1.6% | No |
| 10% NaOH | +1.1% | No |
| 10% NaCl | +0.5% | No |

Example 4

3 Parts of polystyrene beads (Kanepearl) and 3 parts of Esacure KIP 100F were added to 100 parts of sample B (prepared as described above). 50 g of the resin composition were introduced into a polyethylene container (diameter 5 cm, height 6 cm), heated to 50° C. and then exposed to the radiation of a UVL-4000 M3 160 W/cm metal halide mercury lamp arranged 7 cm above the sample. The UV-irradiated samples were cooled to room temperature. The resin cured in this way had a transparent and smooth surface with minimal crack formation and shrinkage. Hardness (Shore D)=75.

Example 5

A sample cured as in Example 4 was tested for its thermal shock behavior.
Thermal shock test A ring of filter paper (diameter 1.9 cm, height 0.54 cm) was placed in the middle of an aluminium dish (diameter 5 cm, height 4 cm). A ring of galvanized steel (external diameter 2.6 cm, internal diameter 1.7 cm, thickness 0.2 cm) was then placed on the paper ring. The resin composition used in Example 4 was gradually poured into the aluminium dish in such a way that the resin composition had a layer thickness of 20 mm. After the empty space within the galvanized steel ring and the paper ring had been filled with resin composition, the resin was exposed for 10 seconds to the radiation of a UVL-4000 M3 160 W/cm metal halide mercury lamp arranged 7 cm above the specimen. The cured specimens were cooled to room temperature and left standing for 7 days. The heat cycle test was carried out with 3 specimens in an air circulation oven first for 1 hour at 0° C. and then for 1 hour at 80° C. The results are listed in Table 4.

TABLE 4

| | Cycle | | | | | | | | | |
|---|---|---|---|---|---|---|---|---|---|---|
| Sample | 1 | 2 | 3 | 4 | 5 | 6 | 7 | 8 | 9 | 10 |
| 1 | 0 | 0 | 0 | 0 | 0 | 0 | 0 | 0 | 1 | 1 |
| 2 | 0 | 0 | 0 | 2 | 1 | — | — | — | — | — |

Sample 1: Produced in accordance with Example 5.
Sample 2: Sample A of Example 1 was mixed with the photoinitiator. The resin composition was then exposed to UV radiation as in Example 5.
The figures in Table 4 correspond to the numbers of cracks.

Example 6

A casing (a) of phenolic resin, which had small depressions (10 mm×10 mm×10 mm) in its upper surface, contains electrical terminals (d) in each depression. As shown in FIG. 1, electrical wires (b, insulated) were connected to each terminal by small screws (c).
a: Casing (phenolic resin)
b: Electrical wire (insulated with PVC)
c: Screw (copper)
d: Terminal (copper)

A resin composition of sample A mixed with Esacure KIP 100F (3 parts to 100 parts of resin composition) was heated to 30° C. and, after connection of the electrical wire, was poured into each depression of the casing. The resin composition was then exposed for 10 seconds to the radiation of a UVL-4000 M3 160 W/cm metal halide mercury lamp arranged 10 cm above the depressions. After irradiation, the resin composition was thoroughly cured, both the terminal and the wire being sufficiently sealed with cured resin without any crack formation or shrinkage. The cured resin composition showed high heat resistance at 150° C.

Example 7

A casing (a) of phenolic resin, which had small depressions (length 20 mm, width 20 mm, depth 10 mm) in its upper surface, contains electrical terminals (d) in each depression. As shown in FIG. 1, insulated electrical wires (b) were connected to each terminal by small screws (c). The resin composition of Example 4 was preheated to 30° C. and, after connection of the electrical wire, was poured into each depression of the casing. The resin composition was then exposed for 10 seconds to the radiation of a UVL-4000 M3 160 W/cm metal halide mercury lamp in the same way as in Example 6. After irradiation, the resin composition was thoroughly cured, both the terminal and the wire being adequately sealed with cured resin without any crack formation or shrinkage.

Example 8

A deflection yoke coil (diameter 18 cm) for cathode ray tubes was coated with the resin composition to tighten the coil. 0.1 Part of colloidal silica and 3 parts of Esacure KIP 100F were added to 100 parts of the resin composition of sample A to form a thixotropic mixture. The yoke coil was then immersed in the mixture thus formed and subsequently withdrawn in such a way that around 50 g of the mixture were distributed over the surface of the coil. The coated yoke coil was then exposed for 10 seconds at 25° C. to the radiation of a UVL-4000 M3 160 W/cm metal halide mercury lamp arranged 10 cm above the coil. After the UV irradiation, the coated coil was tightened with resin composition to prevent fraying. The coated coil shows high heat resistance and does not soften even at 140° C.

Effect of the Invention

The resin composition according to the invention is cured by brief exposure to UV radiation and gentle heating and forms a hard resin with high resistance to heat and water, good electrical insulation properties and minimal crack formation and shrinkage. Accordingly, the resin composition is suitable for the molding, potting and coating of electrical/electronic components and auto parts.

What is claimed is:

1. A polymerizable curable composition comprising (A) 100 parts by weight of an unsaturated epoxyester resin with an acid value below 3.0, (B) 10 to 40 parts by weight of a polymerizable monomer selected from the group consisting of phenoxyethyl acrylate, 2-acroyloxyethyl-2-hydroxypropyl phthalate and mixtures thereof and (C) 1 to 5 parts by weight of a mixture of hydroxyketone oligomer and 2-hydroxy-2-methyl-1-phenylpropan-1-one.

2. A composition as claimed in claim 1 further comprising (D) 0.5 to 5 parts by weight of polystyrene microbeads.

3. A composition as claimed in claim 1 wherein said unsaturated epoxyester resin is derived from a mixture of an unsaturated carboxylic acid and an epoxy compound.

4. A composition as claimed in claim 3 wherein said unsaturated carboxylic acid is selected from the group consisting of maleic acid, fumaric acid, itaconic acid, acrylic and methacrylic acid.

5. A polymerizable curable composition, comprising: (A) 100 parts by weight of an unsaturated epoxyester resin with an acid value below 3.0, (B) 10 to 40 parts by weight of a polymerizable monomer selected from the group consisting of phenoxyethyl acrylate, 2-acroyloxyethyl-2-hydroxypropyl phthalate and mixtures thereof and (C) 1 to 5 parts by weight of a mixture of hydroxyketone oligomer and 2-hydroxy-2-methyl-1-phenylpropan-1-one wherein said unsaturated epoxyester resin is derived from a mixture of unsaturated carboxylic acid, saturated carboxylic acid and epoxy compound.

6. A composition as claimed in claim 5 wherein said saturated carboxylic acid is selected from the group consisting of aliphatic mono-carboxylic acids, aromatic mono-carboxylic acids, aliphatic polybasic carboxylic acids and aromatic polybasic carboxylic acids.

7. A composition as claimed in claim 5 wherein said saturated carboxylic acid is selected from the group consisting of butyric acid, lauric acid, stearic acid hydroxystearic acid, succinic acid, adipic acid, azelaic acid, sebacic acid hexahydrophthalic acid, oleic acid, ricinoleic acid, phthalic acid, isophthalic acid and trimellitic acid.

8. A composition as claimed in claim 5 wherein said unsaturated carboxylic acid is present in a quantity of at least 10 equivalent-% based on total carboxylic acid.

9. A composition as claimed in claim 5 wherein said unsaturated carboxylic acid is present in a quantity of 20 to 95 equivalent-% based on total carboxylic acid.

10. A composition as claimed in claim 5 wherein said unsaturated carboxylic acid is present in a quantity of 40 to 80 equivalent-% based on total carboxylic acid.

11. A composition as claimed in claim 1 wherein said unsaturated epoxyester resin is prepared by an esterification reaction of a total of less than 1.0 equivalent of carboxyl groups with 1.0 equivalent of epoxy groups to form a reaction mixture, the esterification reaction being continued until the acid value of the reaction mixture has fallen below 3.0.

12. A polymerizable curable composition, comprising: (A) 100 parts by weight of an unsaturated epoxyester resin with an acid value below 3.0, (B) 10 to 40 parts by weight of a polymerizable monomer selected from the group consisting of phenoxyethyl acrylate, 2-acroyloxyethyl-2-hydroxypropyl phthalate and mixtures thereof and (C) 1 to 5 parts by weight of a mixture of hydroxyketone oligomer and 2-hydroxy-2-methyl-1-phenylpropan-1-one wherein said unsaturated epoxyester resin is derived from an epoxy compound selected from the group consisting of reaction products of epichlorohydrin with one or more of bisphenol A, glycols, carboxylic acids, phenol/formaldehyde condensates and oxidation products of unsaturated compounds.

13. A composition as claimed in claim 1 wherein said polymerizable monomer performs the function of reducing the viscosity of the epoxyester and the resin composition.

14. A composition as claimed in claim 1 wherein said polymerizable monomer is a mixture of at least one of said monomers with one or more than one monomer selected from the group consisting of styrene, vinyl toluene, divinyl benzene, methyl methacrylate, methacrylonitrile, diallyl phthalate and 2-ethylhexyl acrylate.

15. A composition as claimed in claim 1 wherein the amount by weight of polymerizable monomer is 15–20 parts per 100 parts by of unsaturated epoxyester resin.

16. A composition as claimed in claim 1 further comprising a filler selected from the group consisting of silica flour, titanium dioxide and polystyrene microbeads.

17. A composition as claimed in claim 1 further comprising polystyrene microbeads in amount effective to reduce the shrinkage of a cured resin formed from said composition, without affecting its curing properties.

18. A composition as claimed in claim 17 wherein said polystyrene microbeads consist of microbeads having a diameter 0.2 to 0.5 mm which contains a volatile liquid that foams on heating under pressure.

19. A composition as claimed in claim 1 further comprising polystyrene microbeads in a quantity of 1 to 3 parts by weight, based on 100 parts by weight of unsaturated epoxy ester resin.

20. A composition as claimed in claim 1 wherein said hydroxyketone oligomer is the oligomer of 2-hydroxy-2-methyl-1-[4-(1-methylvinyl)-phenyl]-propanone.

21. A composition as claimed in claim 1 wherein said mixture of hydroxyketone oligomer and 2-hydroxy-2-methyl-1-phenylpropan-1-one has a weight ratio of hydroxyketone oligomer to 2-hydroxy-2-methyl-1-phenylpropan-1-one of 7:3.

22. A composition as claimed in claim 21 wherein said hydroxyketone oligomer is the oligomer of 2-hydroxy-2-methyl-1-[4-(1-methylvinyl)-phenyl]-propanone.

23. A composition as claimed in claim 1 wherein the quantity of mixture of hydroxyketone oligomer and 2-hydroxy-2-methyl-1-phenylpropan-1-one is from 2.0 to 3.5 parts by weight, based on 100 parts by weight of unsaturated epoxy ester composition.

24. A composition as claimed in claim 1 further comprising a photosensitizer.

25. A composition as claimed in claim 24 wherein said photosensitizer is selected from the group consisting of benzophenone and tertiary amines.

26. A composition as claimed in claim 1 further comprising a promoter selected from the group consisting of methyl ethyl ketone or cumene peroxide.

27. A molding process using the polymerizable curable composition claimed in claim 1 wherein said composition is exposed to UV radiation and heating to cure said composition.

28. A coating process using the polymerizable curable composition claimed in claim 1 wherein a coating of said composition is exposed to UV radiation and heating to cure said composition.

29. A process as claimed in claim 28 wherein electrical components are coated using said composition.

30. A potting process using the polymerizable curable composition claimed in claim 1 wherein said composition is exposed to UV radiation and heating to cure said composition.

31. A process as claimed in claim 30 wherein electrical components are potted using said composition.

32. A composition of claim 1 which is free of a thermal free-radical initiator.

* * * * *